United States Patent
Wilson et al.

(10) Patent No.: US 9,114,685 B2
(45) Date of Patent: Aug. 25, 2015

(54) REDUCED WEIGHT AXLE COUPLING ASSEMBLY FOR VEHICLE SUSPENSION SYSTEMS

(71) Applicant: Hendrickson USA, LLC, Itasca, IL (US)

(72) Inventors: William Wilson, Downers Grove, IL (US); Damon E. Dilworth, Channahon, IL (US); Jerome L. Cortez, Tinley Park, IL (US); Ashley T. Dudding, Plainfield, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/830,523

(22) Filed: Mar. 14, 2013

(65) Prior Publication Data

US 2014/0138929 A1    May 22, 2014

Related U.S. Application Data

(60) Provisional application No. 61/680,135, filed on Aug. 6, 2012.

(51) Int. Cl.
*B60G 11/00* (2006.01)
*B60G 11/113* (2006.01)

(52) U.S. Cl.
CPC ........ *B60G 11/113* (2013.01); *B60G 2200/464* (2013.01); *B60G 2202/112* (2013.01); *B60G 2204/121* (2013.01); *B60G 2204/4306* (2013.01)

(58) Field of Classification Search
CPC ............. B60G 11/113; B60G 9/003; B60G 2204/4306; B60G 2202/112
USPC ......... 280/124.11, 124.116, 124.163, 124.17, 280/124.175; 267/41, 52, 53, 260
See application file for complete search history.

(56) References Cited

U.S. PATENT DOCUMENTS

| 3,151,854 | A |   | 10/1964 | Felburn |
|---|---|---|---|---|
| 3,154,300 | A |   | 10/1964 | Wenzel |
| 3,251,608 | A |   | 5/1966 | Raidel |
| 3,386,724 | A | * | 6/1968 | Chieger et al. ................. 267/52 |
| 3,913,937 | A | * | 10/1975 | Longworth et al. .......... 280/680 |

(Continued)

FOREIGN PATENT DOCUMENTS

| DE | 19704124 A1 | 9/1997 |
|---|---|---|
| DE | 10110495 A1 | 9/2002 |

(Continued)

OTHER PUBLICATIONS

Hellstroem et al., Yoke installation of rear axle of lorry, Sep. 11, 1997, EPO, DE 197 04 124 A1, Machine Translation of Description.*

(Continued)

*Primary Examiner* — James English
(74) *Attorney, Agent, or Firm* — Cook Alex Ltd.

(57) ABSTRACT

An axle coupling assembly and method for coupling a vehicle axle to an energy storing suspension component are disclosed. The assembly includes first and second U-shaped fastener assemblies, first and second flanges configured for connection to the vehicle axle, a mounting pad and a suspension component such as a leaf spring or a leading or trailing arm disposed between the first and second flanges and mounting pad.

17 Claims, 10 Drawing Sheets

(56) References Cited

U.S. PATENT DOCUMENTS

| | | | |
|---|---|---|---|
| 4,262,930 A | | 4/1981 | Milne |
| 5,035,406 A | | 7/1991 | Sellers et al. |
| 5,078,420 A | * | 1/1992 | Jable et al. .................... 280/680 |
| 5,470,096 A | | 11/1995 | Baxter |
| 5,921,570 A | * | 7/1999 | Lie ......................... 280/124.175 |
| 6,352,245 B1 | * | 3/2002 | Norden ........................ 267/36.1 |
| 6,406,008 B1 | * | 6/2002 | Dudding et al. ................ 267/52 |
| 6,616,162 B2 | * | 9/2003 | Machens et al. ....... 280/124.175 |
| 8,540,262 B2 | * | 9/2013 | Reiter et al. .......... 280/124.156 |
| 8,632,085 B2 | * | 1/2014 | Davenport et al. .... 280/124.116 |
| 2003/0038445 A1 | | 2/2003 | Sutton et al. |
| 2003/0111143 A1 | | 6/2003 | Wheeler, Jr. |
| 2005/0218620 A1 | * | 10/2005 | Reineck ................. 280/124.116 |
| 2005/0253351 A1 | * | 11/2005 | Pan et al. ............... 280/124.116 |
| 2006/0103103 A1 | * | 5/2006 | Land et al. ............. 280/124.163 |
| 2006/0244236 A1 | * | 11/2006 | Cortez et al. .......... 280/124.175 |
| 2009/0115156 A1 | | 5/2009 | Tsujihama et al. |
| 2010/0187789 A1 | * | 7/2010 | Dudding et al. ....... 280/124.116 |
| 2011/0017014 A1 | | 1/2011 | Batdorff |
| 2011/0248115 A1 | | 10/2011 | Proia |

FOREIGN PATENT DOCUMENTS

| | | |
|---|---|---|
| DE | 102004010621 A1 | 9/2005 |
| DE | 19704124 B4 | 9/2009 |
| DE | 10110495 B4 | 5/2010 |
| EP | 1446244 B1 | 7/2007 |
| EP | 1958801 A2 | 8/2008 |
| GB | 443433 A | 2/1936 |
| JP | 08127210 A | 5/1996 |
| JP | 09113341 A | 5/1997 |
| JP | 10166826 A | 6/1998 |
| JP | 2007/062537 A | 3/2007 |
| NL | 1009580 C2 | 1/2000 |
| WO | WO 03/035295 A1 | 5/2003 |
| WO | WO 2010/140928 A1 | 9/2010 |
| WO | WO 2011/109011 A1 | 9/2011 |

OTHER PUBLICATIONS

Thomas Klaas, Axle connection includes tension rods with at least one bend or offset along longitudinal extent, and up to offset run parallel to respective side wall of axle body and after offset extend with increasing distance between it and axle body, Sep. 19, 2002, EPO, DE 101 10 495 A1, Machine Translation of Description.*
International Search Report dated Sep. 23, 2013 for International Application No. PCT/US2013/053466.

* cited by examiner

REDUCED WEIGHT AXLE COUPLING ASSEMBLY FOR VEHICLE SUSPENSION SYSTEMS

CROSS-REFERENCE TO RELATED APPLICATION

This application claims the benefit of U.S. Provisional Patent Application Ser. No. 61/680,135, filed Aug. 6, 2012, the disclosure of which is hereby incorporated by reference in its entirety.

BACKGROUND OF THE INVENTION

1. Field of the Invention

The present invention generally relates to axle coupling assemblies and suspension systems that employ these assemblies for use in a vehicle. The disclosure presents several example embodiments that may be utilized for particular purposes.

2. Discussion of the Prior Art

Wheeled vehicles commonly have suspension systems that that utilize axle coupling assemblies to attach an axle to a leaf spring or other suspension component, which in turn, is attached to a frame or directly to a body assembly.

In a suspension system, sprung weight refers to the total weight of the vehicle that is supported by the suspension system. Unsprung weight refers to the weight that is not supported by the suspension system of a vehicle. The unsprung weight of a vehicle is generally made up of the suspension system, along with the tires, wheels, axle and axle mounting assemblies which attach the axle to suspension components, such as for example, a leaf spring or a leading or trailing arm.

Truck and other heavy vehicle suspension systems have a considerable amount of unsprung weight that must be controlled to provide a sufficiently comfortable ride for the driver and cargo and eliminate problems such as wheel hop and vibration. Ideally, this weight is kept as low as possible because forces generated by unsprung weight may be transmitted through the suspension and other parts of the vehicle. Lighter weight axle coupling assemblies which reduce unsprung weight are generally desired to the extent that they provide for greater control and improve performance and efficiency of a suspension system.

The present disclosure addresses shortcomings found in prior art suspension systems and the existing methods that are commonly available for use.

SUMMARY OF THE INVENTION

This disclosure is directed to an axle coupling assembly for coupling an axle in wheeled vehicles and trailers to a suspension system that includes energy storing components such as, for example, leaf springs, or trailing arms or beams. It may be utilized in front and rear suspensions of motorized vehicles and trailers, and provides the suspension component, such as a leaf spring, with enhanced performance, control and efficiency by reducing the size and weight of the coupling assembly, while at the same time, reducing and/or eliminating nut face angularity problems that can be created when attempting to accommodate caster or pinion angle.

In a first aspect, disclosed herein is an axle coupling assembly for coupling an energy storing suspension component to a vehicle axle. The assembly includes first and second U-shaped fastener assemblies, first and second flanges configured for connection to the vehicle axle, a mounting pad or what may also be referred to as a top pad, and a suspension component such as leaf spring or the like disposed between the first and second flanges and mounting pad. Each U-shaped fastener assembly has a bight portion, first and second legs and connectors or nuts, and as one example, would include a U-bolt with connectors or nuts. Each flange has a grooved surface which pivotally engages the bight portion of a U-shaped fastener assembly. The U-shaped fastener assemblies accommodate and fix in position a preselected angular relationship between the suspension component and the vehicle axle while achieving and maintaining parallel engagement between the respective engagement surfaces of the connectors and mounting pad.

In a second aspect, disclosed herein is a method of coupling a suspension component to a vehicle axle. Such method includes: providing first and second U-shaped fastener assemblies, each of which includes a bight portion, first and second legs and connectors having engagement surfaces; providing first and second flanges, each having a grooved surface that pivotally engages a bight portion of a respective U-shape fastener assembly; providing a mounting pad spaced from the grooved surfaces of the flanges and having bores through which the first and second legs of the U-shaped fastener assemblies extend; providing a suspension component between the flanges and mounting pad; and installing the U-shaped fastener assemblies wherein the axle coupling assembly automatically accommodates a caster or pinion angle while providing alignment between the respective engagement surfaces of the connectors and mounting pad.

It is to be understood that both the foregoing general description and the following detailed description are exemplary and are provided for purposes of explanation only and are not restrictive to the subject matter claimed. Further features and objects of the present disclosure will become more apparent in the following description of the example embodiments and from the appended claims.

BRIEF DESCRIPTION OF THE DRAWINGS

In describing the preferred examples, reference is made to the accompanying drawing figures wherein like parts have like reference numerals, and wherein.

It should be understood that the drawings are not to scale. While some mechanical details of suspension systems and axle coupling assemblies for a wheeled vehicle, including some details of fastening means, connection to well known vehicle components, and other plan and section views of the particular components, have been omitted, such details are considered within the comprehension of those skilled in the art in light of the present disclosure. It also should be understood that the present disclosure is not limited to the examples illustrated.

DETAILED DESCRIPTION

This disclosure presents examples of axle coupling assemblies for use in suspension systems and related methods which reduce unsprung vehicle weight, accommodate caster or pinion angle, and may reduce the inactive portion of a leaf spring or other suspension component to which the axle coupling assembly is attached.

Figure 1:
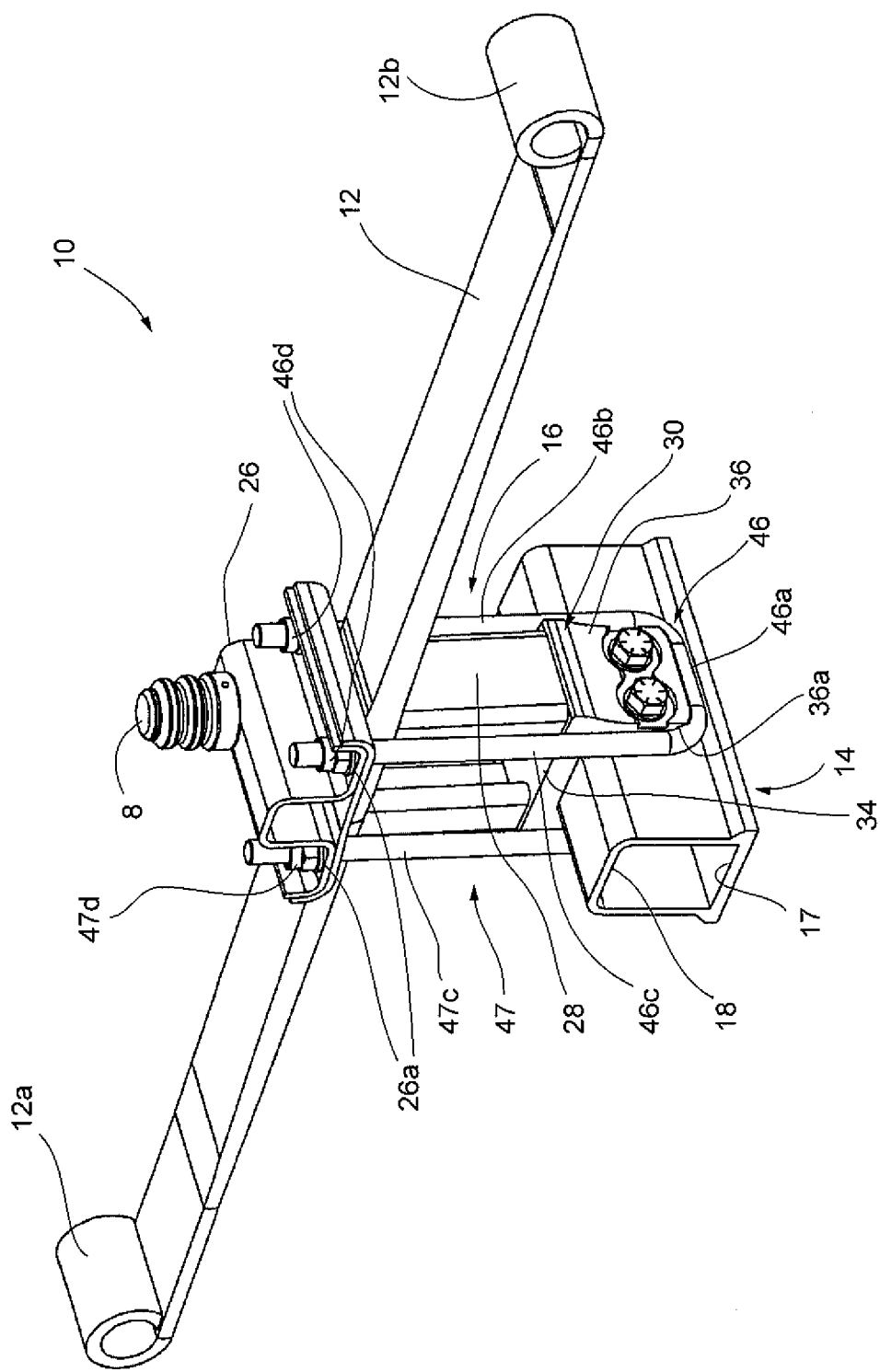
FIG. 1 is an upper front perspective view of an axle coupling assembly including a first example of the inventive subject matter, wherein an axle is shown coupled to a leaf spring.
Figure 3:
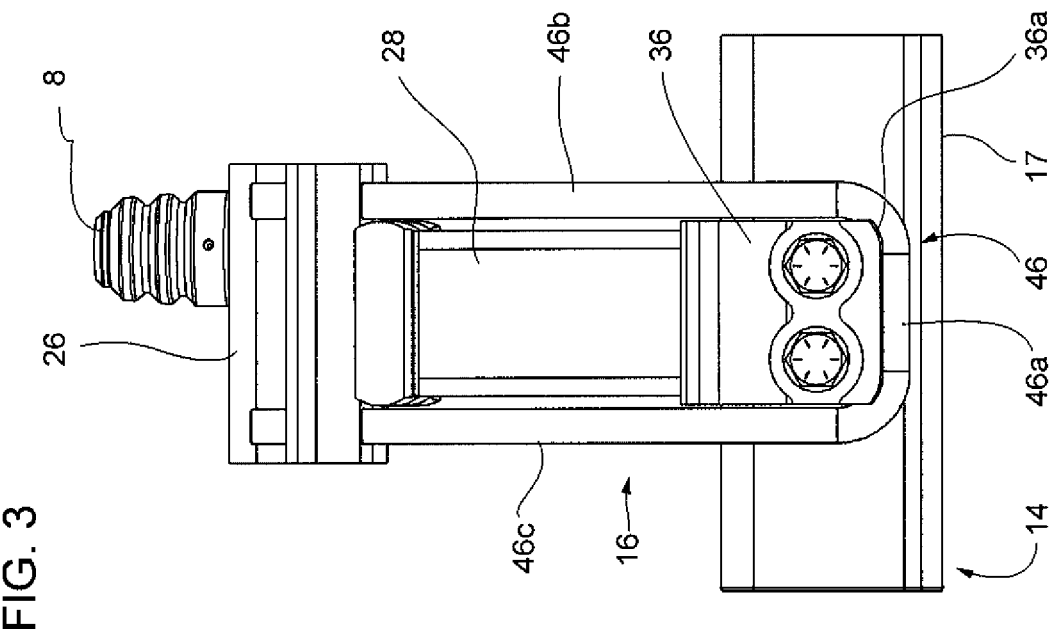
FIG. 3 is a lower front perspective view of the components shown in FIG. 2.
Figure 2:
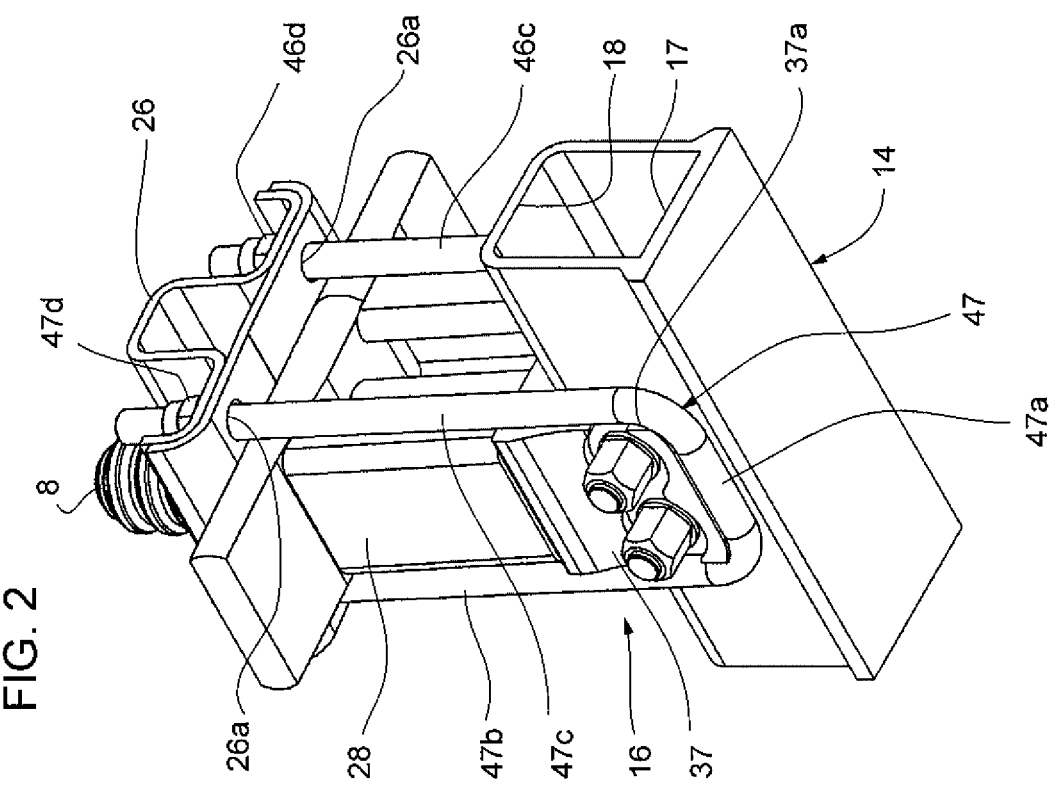
FIG. 2 is a lower front perspective view of the components shown in FIG. 1.
Figure 4:
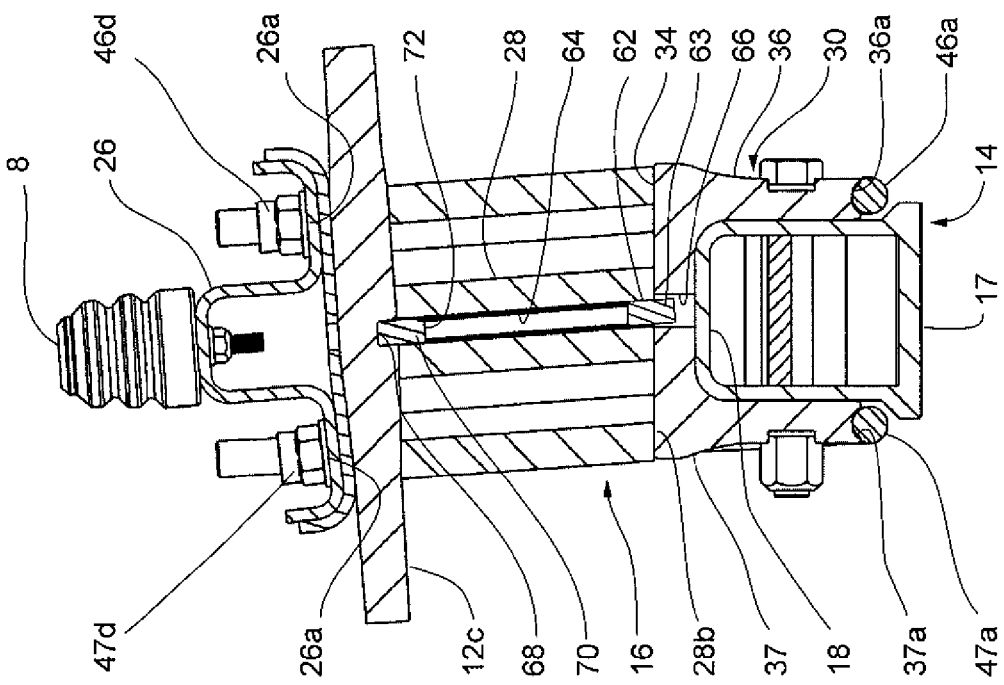
FIG. 4 is a side view of the right side of the components shown in FIG. 2.

Referring to the drawings, a first embodiment of this disclosure is shown in FIGS. 1-9. The reference numeral 10 generally designates a suspension system that includes a suspension component, which in this embodiment is shown as a leaf spring 12, mounted to a fabricated axle 14 utilizing an axle coupling assembly 16. Leaf spring 12 includes a front eye 12a, and a rear eye 12b, each of which is sized and configured to receive a bushing (not shown). As with the other drawings in this disclosure, it will be appreciated that the axle coupling assembly 16 shown in FIG. 1 is intended for use with a front steering axle, but the axle coupling assembly could be configured for use with a non-steering rear axle. Furthermore, the figures show a system for one side of a wheeled vehicle or trailer and a similar system would be provided on the opposite side to form a full front or rear suspension system In FIG. 1, an axle coupling assembly 16 of the present disclosure is configured with a leaf spring 12 and a bumper member 8 affixed to a mounting pad 26. It will be appreciated that the suspension system 10 could instead not include the bumper member 8, or such a bumper member could be coupled to the frame of a vehicle. As discussed and shown in further embodiments, it will be appreciated that the axle coupling assembly 16 could be used with other energy storing suspension components, such as for example, dual leaf springs, a leading arm, or trailing arm, or variations of any of the foregoing, in lieu of the single leaf spring 12 shown in FIG. 1, to suit particular installations and vehicle characteristics.

In the first embodiment of an axle coupling assembly 16, the axle is shown as a fabricated axle 14 that includes a laterally extending box section to provide roll stability. The axle 14 includes a bottom plate 17 welded to an inverted U-shaped member 18, which for convenience, are shown together in the drawings as an integral piece. The axle 14 may be constructed of steel, or other suitable materials, and may be constructed in the manner described or by alternative manufacturing techniques to result in a fabricated or hollow axle member, or may be constructed as a solid axle.

The axle coupling assembly 16 shown in FIG. 1 comprises a mounting pad 26, which also may be known as a top pad, with bumper member 8; a spacer 28; an axle seat bracket 30 having an upper surface 34 and downwardly depending first and second flanges 36, 37; first and second U-shaped fastener assemblies 46, 47, each having a seat or bight portion 46a, 47a, first and second legs 46b, 46c, 47b, 47c, and connectors or nuts 46d, 47d. It will be appreciated that the distal ends of the first and second legs are threaded and threadedly receive the connectors or nuts. In this embodiment, the first and second flanges 36, 37 are incorporated into an axle seat bracket 30, and are of integral construction therewith.

The mounting pad 26, which is spaced apart from the first and second flanges 36, 37, preferably is forged or cast iron or steel. The spacer 28 and axle seat bracket 30 are preferably constructed of extruded aluminum, such as 6061-T6, although other suitable grades of aluminum may be used, and indeed other suitable materials, configurations and methods of construction may be used, including for example, cast iron or steel parts.

Each of the flanges 36, 37 has a grooved surface 36a, 37a that pivotally engages a bight portion 46a, 47a of one of the respective first and second U-shaped fastener assemblies 46, 47. Disposed between the mounting pad 26 and upper surface 34 of the axle seat bracket 30 are a suspension component, such as for example, the leaf spring 12, and the spacer 28. The first and second legs 46b, 46c, 47b, 47c of the respective U-shaped fasteners 46, 47 extend through bores 26a in the mounting pad 26 and receive the connectors 46d, 47d, although it will be appreciated that other structures may be employed to form the U-shaped fastener assemblies. The bight portion and the first and second legs of the U-shaped fasteners may be separate, or may be of integral construction as illustrated in the first embodiment.

In this embodiment, the flanges 36, 37 of the respective axle seat bracket 30 include aligned bores 32 that receive cylindrical sleeves 44 constructed of aluminum, steel or the like, through which extend fasteners 42, such as hardened bolts that engage nuts 42a, so as to connect the axle seat bracket 30 to the axle 14. For enhanced support to the axle 14 when the fasteners 42 are tightened, the sleeves 44 that are located within the bores provide assistance in locating a baffle or support member 43 within the axle 14. The sleeves 44 are sized to fit within the bores 32 in the axle 14, while being slightly shorter than the distance between the exterior surfaces of the inverted U-shaped member 18 of the axle 14. This permits a connection with slight deformation in the U-shaped member 18 of the axle 14 to provide solid clamping of the axle seat bracket 30 to the axle 14. It will be appreciated that the sleeves 44 and/or the support member 43 may not be necessary, depending on the construction of the axle 14 and the axle seat bracket 30.

It will be appreciated by those skilled in the art that it may be desirable for the front or rear axle to be configured to incorporate a fixed caster or pinion angle. Accordingly, as may be seen in FIGS. 4 and 5, a fixed caster angle may be included within the axle coupling assembly 16 by including it within the configuration of the spacer 28. In this embodiment, the spacer 28 includes an upper surface 54 that engages the leaf spring 12 where the upper surface 28a is angled relative to a lower surface 28b of the spacer 28. A fixed caster angle could otherwise be provided by including an additional wedge component, or could be built into the axle seat bracket

30. However, a common axle seat bracket may be used if the caster or pinion angle is provided in a spacer or a wedge component.

The pivotally engaged first and second U-shaped fastener assemblies 46, 47 allow the axle coupling assembly 16 to automatically adjust for a desired caster or pinion angle for the axle 14. As the connectors or nuts 46*d*, 47*d* of the first and second U-shaped fastener assemblies 46, 47 are tightened, the bight portions 46*a*, 47*a* will pivot at their engagement with the grooves 36*a*, 37*a* of the flanges 36, 37 to accommodate the resulting angle between the axle seat bracket 30 and the mounting pad 26. This results in the bottom surface of the connectors or nuts 46*d*, 47*d* being parallel to flush with engagement surfaces that are adjacent bores 26*a* of the mounting pad 26. This effectively eliminates problems with nut face or bolt head angularity that could occur during clamp up of the axle coupling assembly, thereby reducing the likelihood of introducing undesirable bending stresses in the U-shaped fastener assemblies 46, 47.

Figure 5:
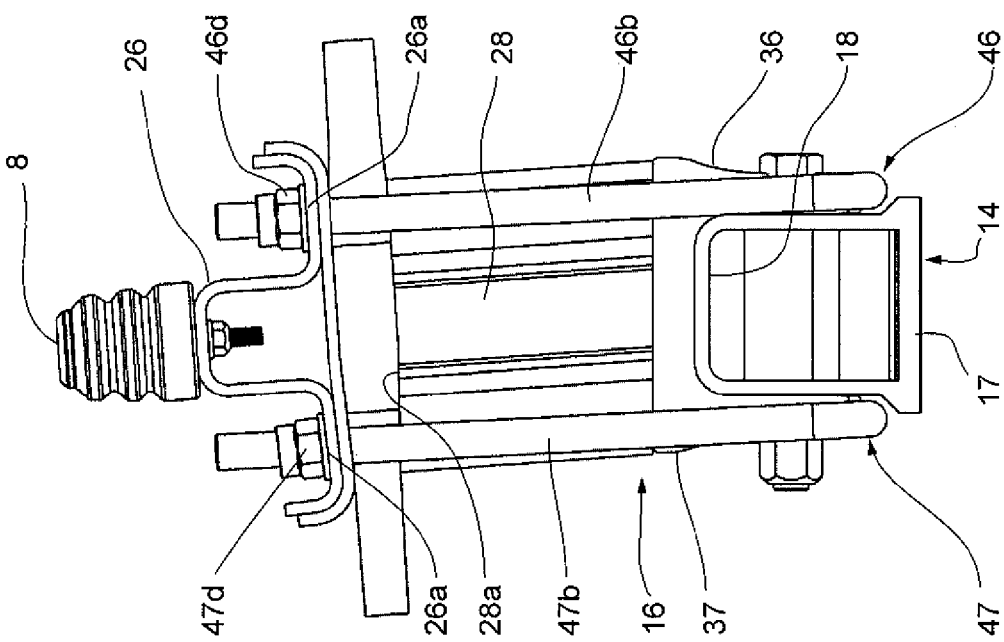
FIG. 5 is a cross-sectional side view of the components shown in FIGS. 2-4 taken through the center of the axle coupling assembly.

As best shown in FIG. 5, a locating feature is provided by engagement of a pin or stud 62 with a locator 63 at the lower end of a central passage 64 in the spacer 28. An associated locator 66 is configured as a receptacle in the upper surface 34 of the axle seat bracket 30. Correspondingly, leaf spring 12 also includes a locator 68 in the form of a receptacle in the lower surface 12*c* in which a pin or stud 70 is received. When assembled, the stud 70 is also received in a locator 72 within the upper end of central passage 64 within the spacer 28. The locator 72 that receives the stud 70 in the upper end of central passage 64 assists in positioning and holding the leaf spring 12 longitudinally and laterally within the axle coupling assembly 16.

Figure 7:
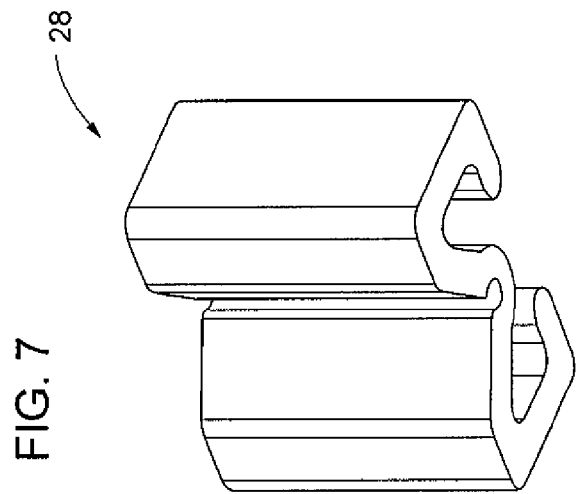
FIG. 7 is a lower perspective view of the spacer shown in FIGS. 1-6.
Figure 6:
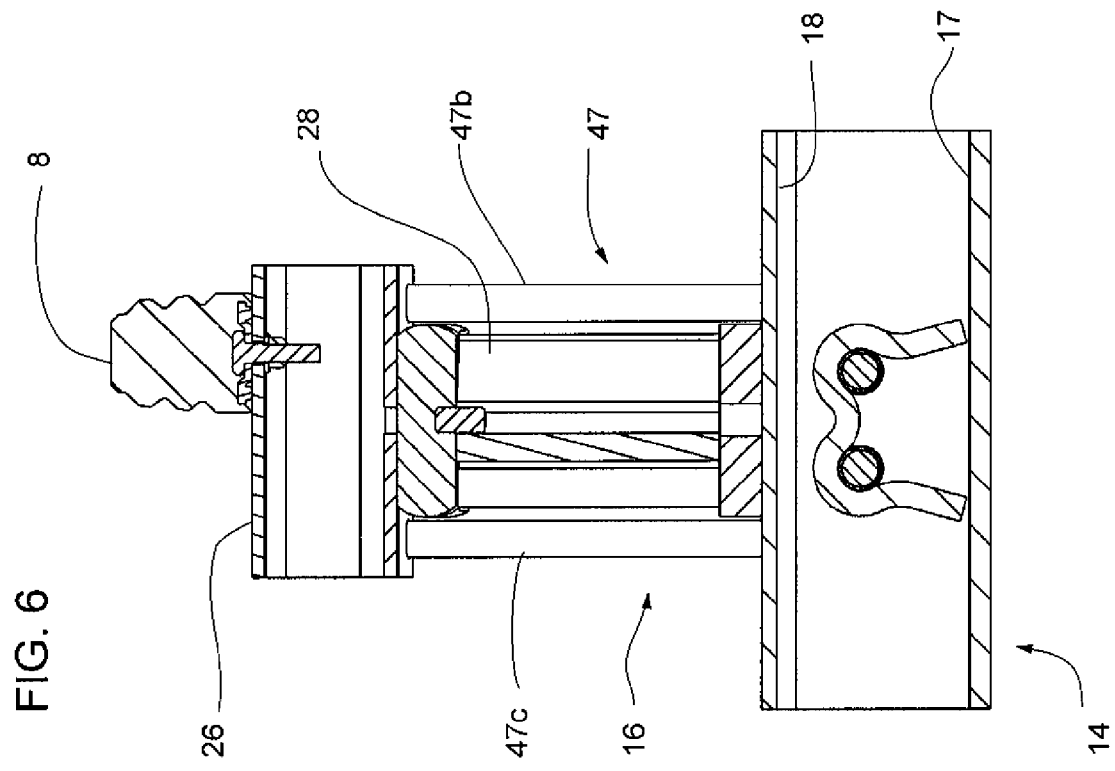
FIG. 6 is a cross-sectional front view taken through the center of the components shown in FIGS. 1-5.
Figure 8:
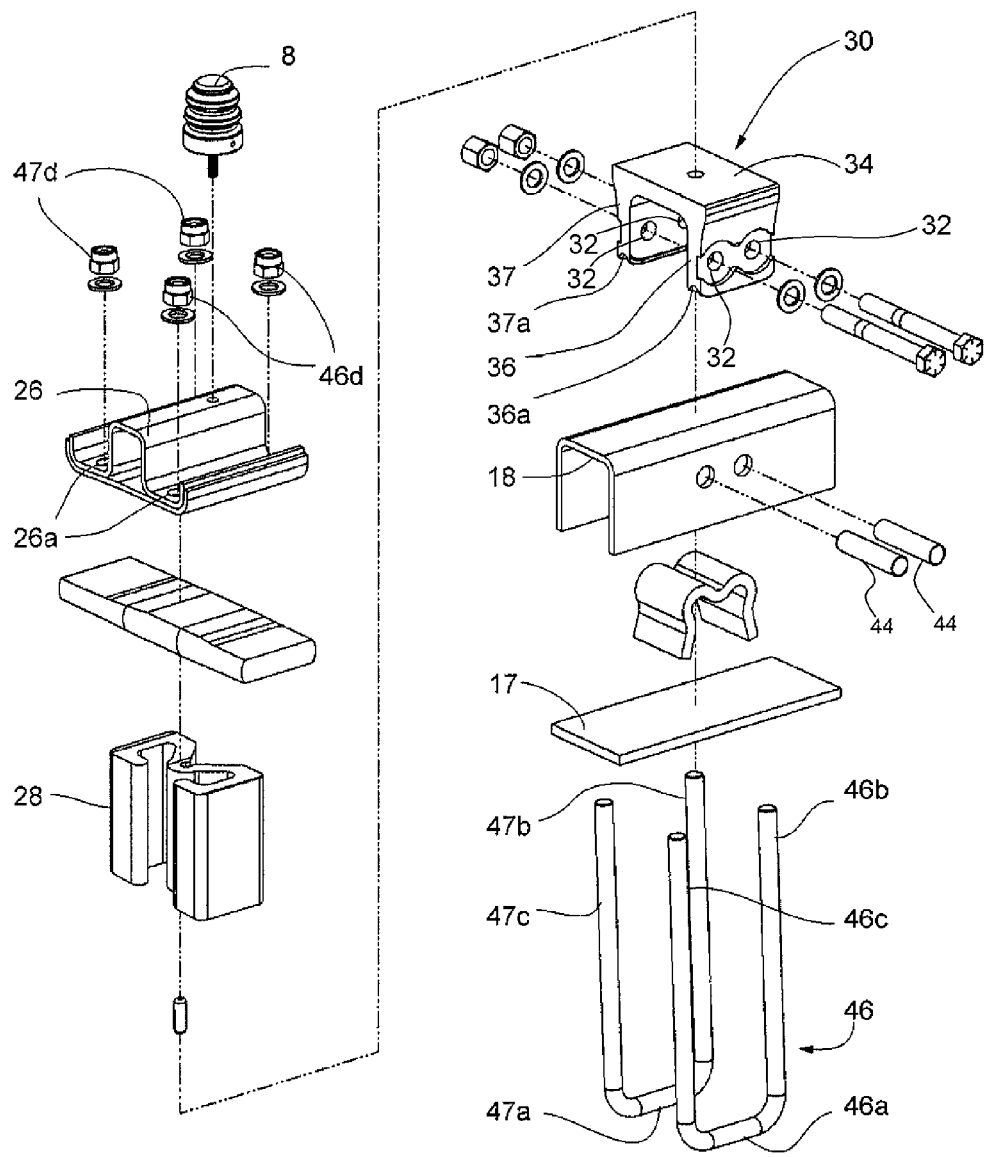
FIG. 8 is an exploded, upper front perspective view of the components shown in FIGS. 2-6.

As may be seen in FIGS. 7 and 8, the spacer 28, includes a lower surface 28*b* and the central passage 64. The spacer may be produced by machining the extruded spacer body, side portions of which have been sculpted to reduce weight.

As may be seen in FIG. 8, each of the U-shaped fastener assemblies 46, 47 includes a U-bolt with legs 46*b*, 46*c*, 47*b*, 47*c*, which extend upwardly from a bight portion 46*a*, 47*a*, which may be straight or may have one or constant or varying curves. It will be appreciated that the precise configuration of this bight portion can vary in accordance with particular design considerations.

Figure 9:
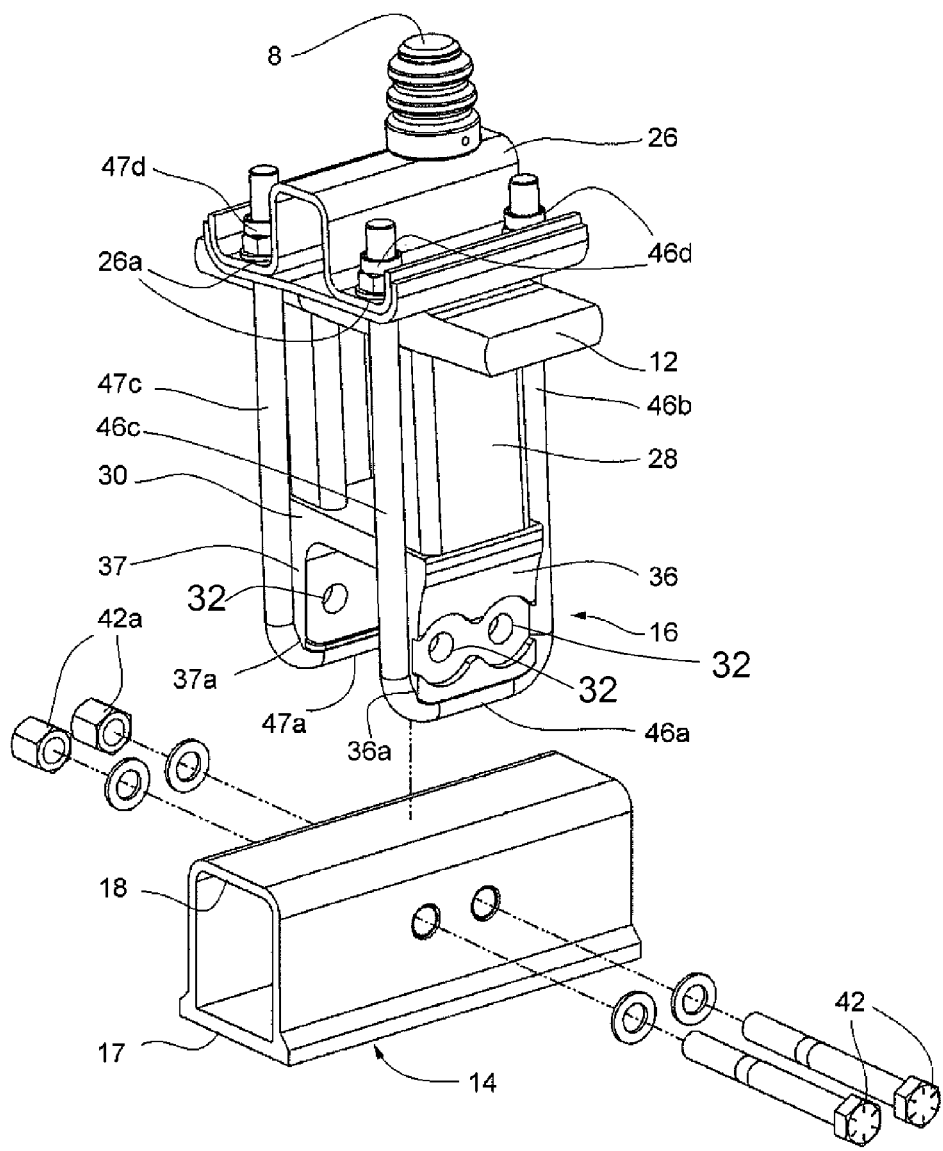
FIG. 9 is a partially exploded, upper front perspective view of the components shown in FIGS. 2-6, schematically illustrating a method of installing the axle to the axle coupling assembly.

FIG. 9 schematically illustrates a method of manufacture and installation of the axle coupling assembly 16 which is particularly suitable for vehicle assembly lines that do not permit full access to the connectors of the U-shaped fastener assemblies from above. As designated by reference number 16 in FIG. 9, the axle coupling assembly components which include the mounting pad 26, leaf spring 12, spacer 28 and axle seat bracket 30 having flanges 36, 37 can be pre-assembled and transferred as a unit to the vehicle manufacturer's assembly line. The axle coupling assembly 16 then can be installed as a unit to the vehicle. The axle 14 then may be lifted into place and secured to the axle coupling assembly 16 via the bolt fasteners 42 and nuts 42*a*.

Thus, in the first embodiment of an axle coupling assembly, a compact, synergistically arranged assembly 16 is achieved by placing the U-shaped fastener assemblies 46, 47 along the sides of the axle 14, thereby reducing the distance between the first and second U-shaped fastener assemblies 46, 47. As a consequence, the size of the mounting pad 26 and axle seat bracket 30 may be smaller and of lighter weight while resulting in a shorter inactive portion of the leaf spring. As the first and second U-shaped fastener assemblies 46, 47 are placed closer to the center line of the axle 14, one may be able to use smaller or thinner fastener assemblies to counteract stresses and maintain clamping integrity.

Throughout this disclosure, with respect to the descriptions of all of the examples and respective components provided, terms such as upper, lower, top, bottom, left, right, front and rear, all are relative terms used for convenience within the description and are not intended to be limiting because they depend on the context in which they are used.

It will be appreciated that some components, for example, fasteners for fastening together various components are not shown in the first example, so as to permit a better view of the more major components of the suspension system 10. Nevertheless, it will be recognized that various methods of fastening together components may be utilized without departing from the scope of the present disclosure, including, for example, nuts and bolts, lag screws, rivets, welding of various types, or any other suitable types of fasteners or fastening means.

Figure 10:
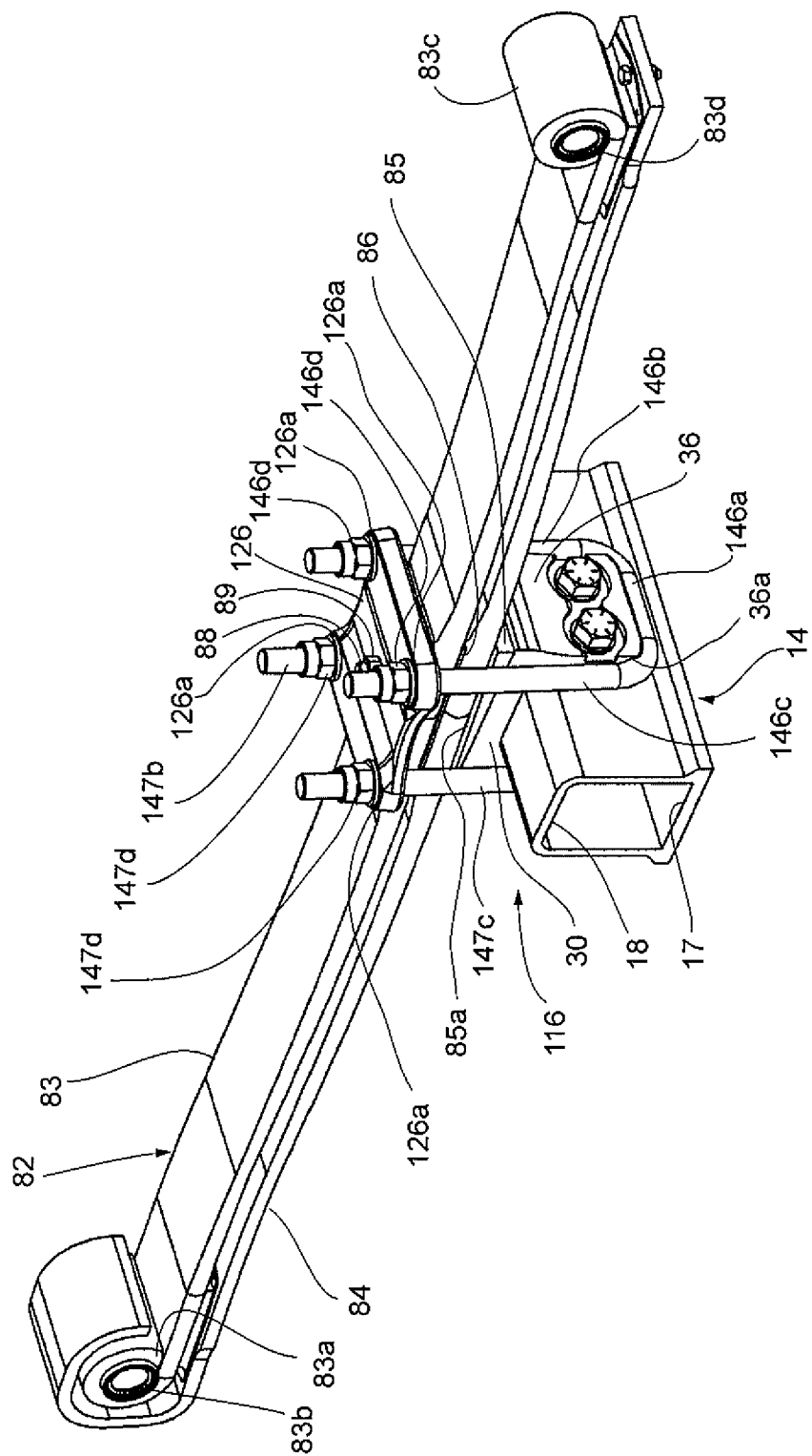
FIG. 10 is an upper front perspective view of an axle coupling assembly including a second example of the inventive subject matter, wherein an axle is shown coupled to a dual leaf spring and a caster wedge is positioned therebetween.
Figure 11:
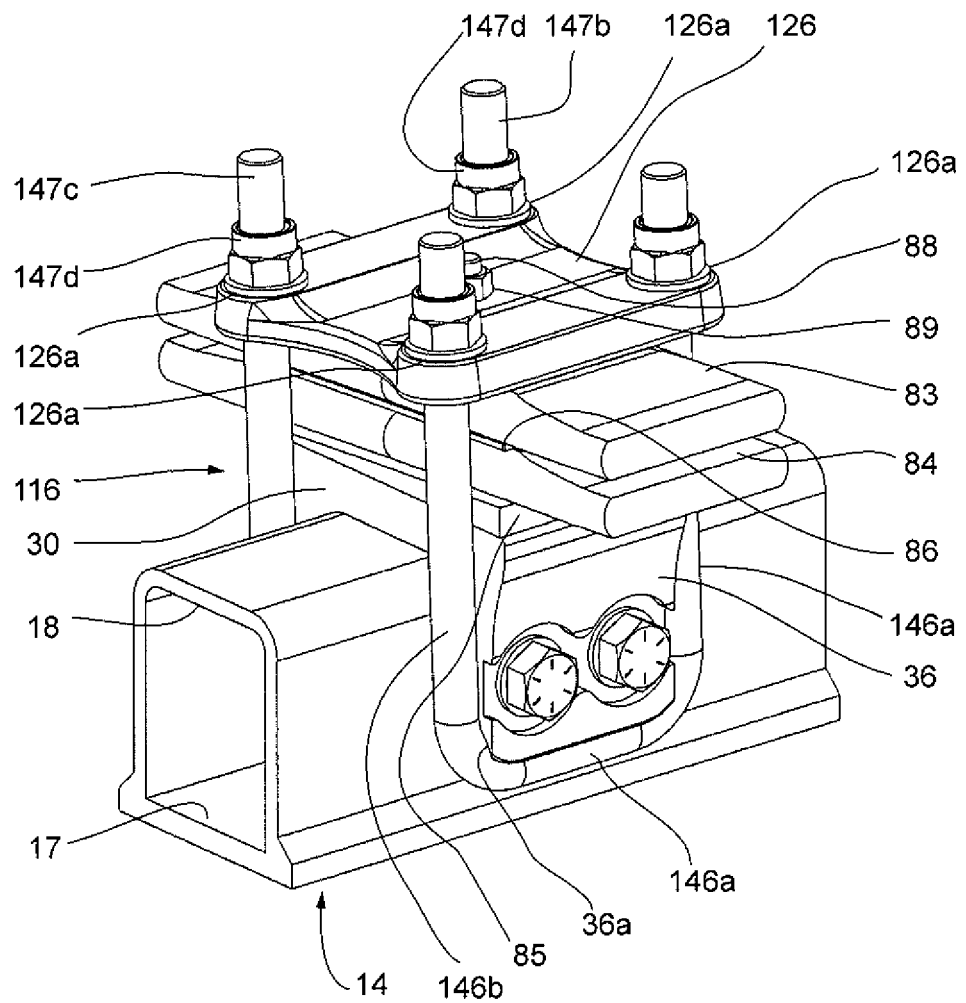
FIG. 11 a closer upper front perspective view of the components shown in FIG. 10.

A second embodiment is shown in FIGS. 10-11 and includes many of the same components previously described in the first embodiment. Accordingly, the same reference numerals and the descriptions above with respect to the first example apply as to those same components. In this embodiment, the axle coupling assembly is generally designated by the reference numeral 116 and is used to couple the axle 14 to dual parallel leaf springs 82 which include an upper leaf spring 83 and lower leaf spring 84. As shown, upper leaf spring 83 includes a front eye 83*a*, a front eye bearing 83*b*, and a rear eye 83*c*, and a rear eye bearing 83*d*. A wedge component 85 having an inclined upper surface 85*a* is positioned below lower leaf 84 and imparts a desired caster angle or pinion angle to the dual leaf springs 82.

As in the case of the first embodiment, as the connectors or nuts 146*d*, 147*d* of the first and second U-shaped fastener assemblies 146, 147 are tightened, the bight portions 146*a*, 147*a* will pivot at their engagement with the grooves 36*a*, 37*a* of the flanges 36, 37 to accommodate and then maintain the resulting angle between the axle seat bracket 30 and the mounting pad 26 in a fixed position. As shown, a fastener, such as a bolt 88 and a nut 89 may extend through aligned apertures in mounting pad 126, upper leaf spring 83 and lower leaf spring 84. The head of bolt 88 may be received in a recess in the top surface of wedge component 85 or the top surface of 34 of axle seat bracket 30.

If desired, a deformable liner 86 may be used between the bottom of the mounting pad and the top surface of the upper leaf spring 83, and/or between the bottom surface of the upper leaf spring 83 and the top surface of the lower leaf spring 84, respectively.

Figure 13:
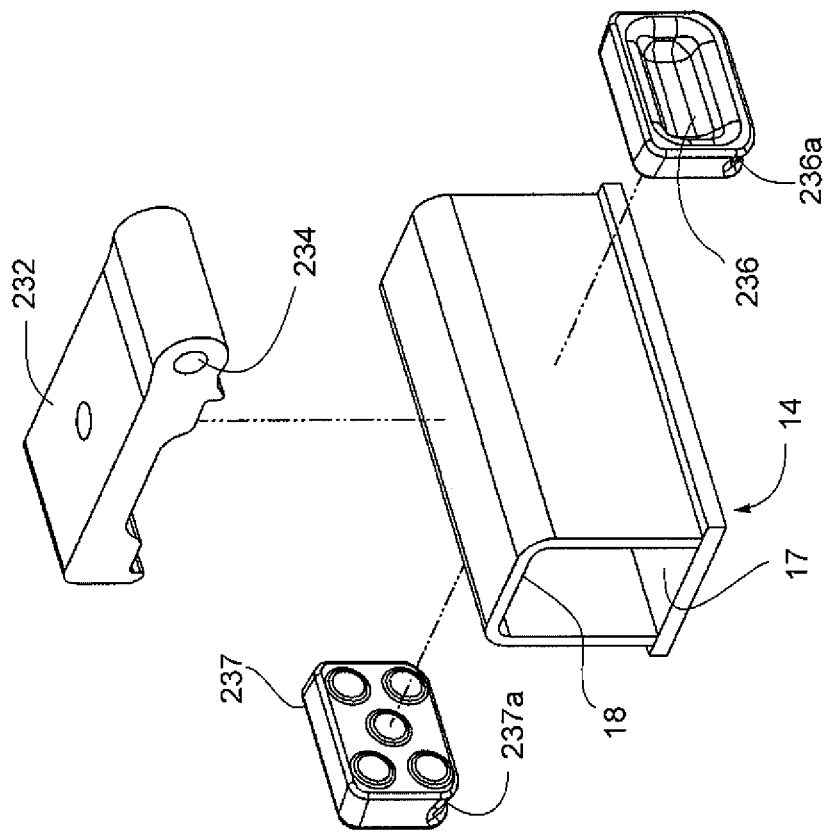
FIG. 13 is an exploded perspective view of the axle seat bracket shown in FIG. 12.
Figure 12:
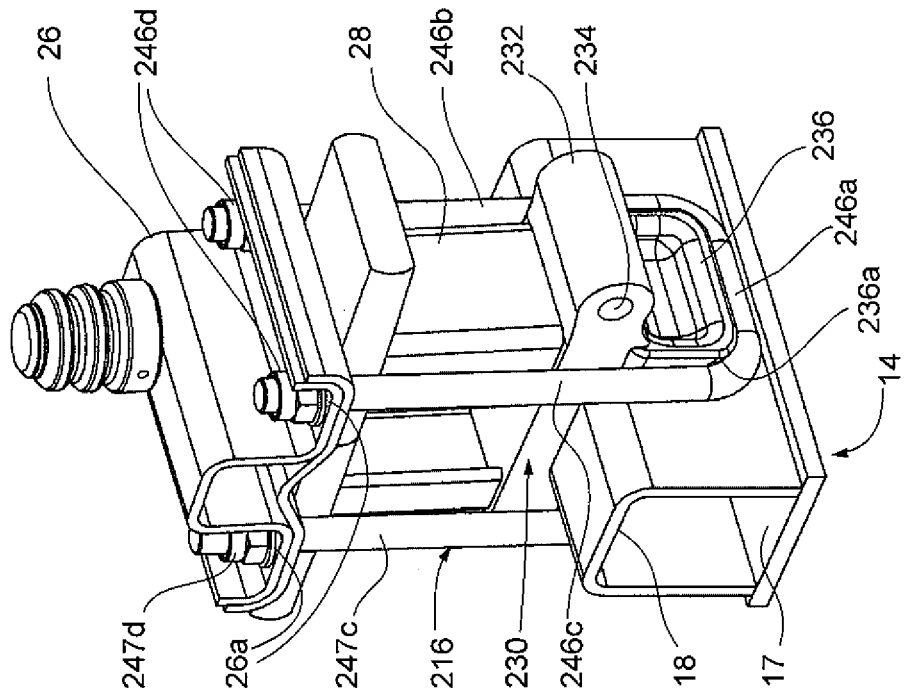
FIG. 12 is an upper front perspective view of an axle coupling assembly including a third example of the inventive subject matter, which is shown with first and second flanges that are incorporated into an axle seat bracket.

A third embodiment is shown in FIGS. 12-13 and includes many of the same components previously described in the preceding embodiments. Accordingly, the same reference numerals and their corresponding descriptions apply to the same components in the third embodiment. The axle coupling assembly generally is designated by the reference numeral 216 and includes an axle seat bracket 230 having first and second flanges 236, 237 and a bracket member 232. The first and second flanges 236, 237 may be attached to the axle by welding, bolts or other suitable fastening means. The bracket member 230 may optionally include a bore 234 therethrough to receive a fastener, such as a bolt, for connection to the lower end of a shock absorber (not shown).

Figure 14:
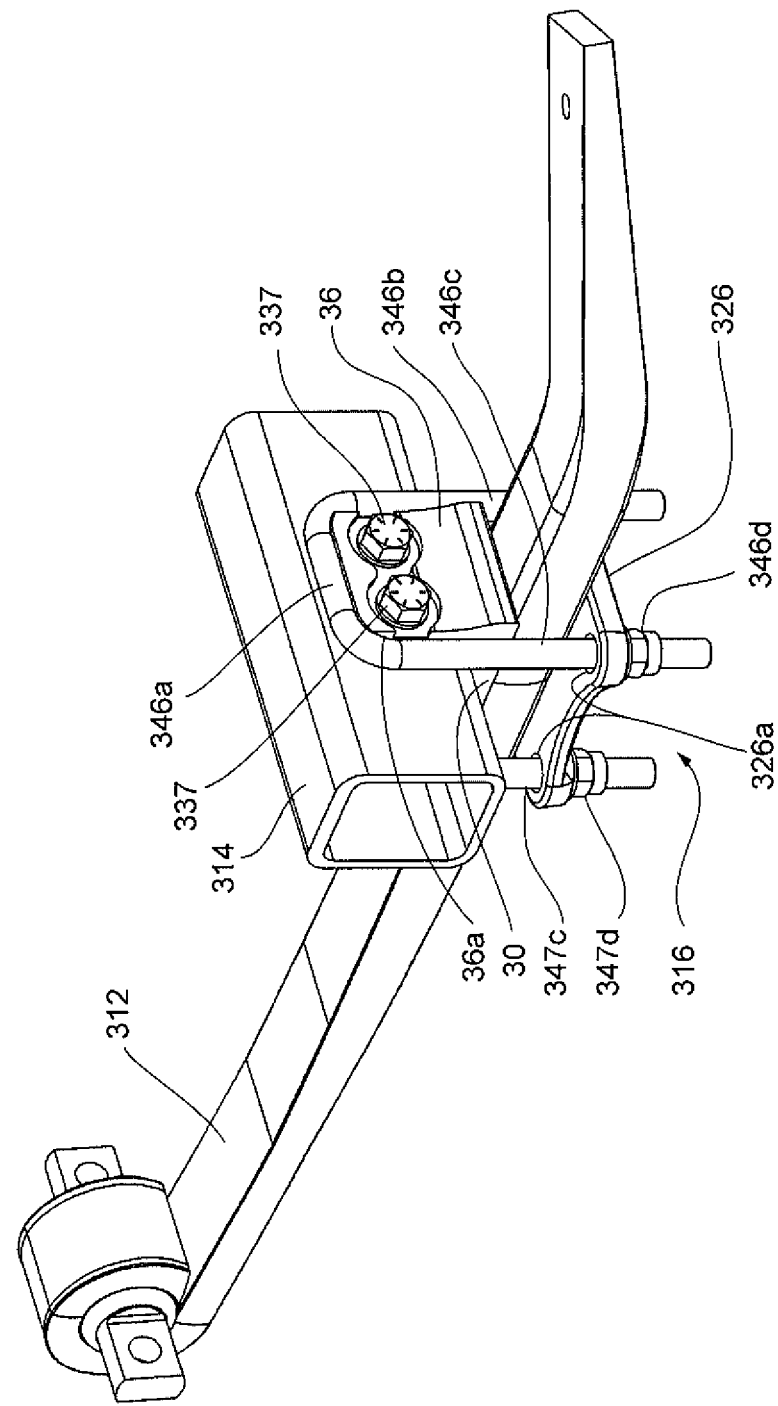
FIG. 14 is an upper front perspective view of an axle coupling assembly including a fourth example of the inventive subject matter, which is shown coupled to a suspension component in an underslung trailing arm configuration.

FIG. 14 illustrates use of an axle coupling assembly 316 of the present disclosure in an underslung trailing arm suspension. As shown, an axle 330 is secured to an axle seat bracket 330 having first and second flanges 336, 337 by a pair of bolts 342 and nuts (not shown) which extend through the sidewalls of the axle 314. Each of the flanges 336, 337 has a grooved surface 336a, 337a that pivotally engages a bight portion 346a, 347a of one of the respective first and second U-shaped fastener assemblies 346, 347. A caster or pinion angle is built into the axle seat bracket 330 in this configuration. The first and second legs of the U-shaped fastener assemblies 346, 347 are shorter in length but are otherwise similar in design and construction to those of previously described embodiments and receive connectors or nuts 346d, 347d after extending through the corresponding bores 326a of a mounting pad 326. This configuration permits parallel engagement between mounting pad engagement surfaces adjacent the bores 326a and respective engagement surfaces on the connectors 346d, 347d.

In light of the above discussion, the drawings and the attached claims, it will be appreciated that suspension systems, axle coupling assemblies and methods of coupling a suspension component to a vehicle axle in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such suspension systems and axle coupling assemblies, and in the performance of such methods, without departing from the scope of the attached claims, and that the claims are not limited to the preferred embodiments illustrated.

We claim:

1. An axle coupling assembly for connecting a suspension component to a vehicle axle, said axle coupling assembly comprising:
    first and second U-shaped fastener assemblies, each comprising a bight portion and first and second legs;
    an axle seat bracket having first and second flanges configured for connection to the vehicle axle, each flange having a grooved surface that pivotally engages the bight portion of one of the U-shaped fastener assemblies;
    a mounting pad spaced from the first and second flanges and having bores through which the respective legs of the first and second U-shaped fastener assemblies extend;
    the suspension component disposed between the first and second flanges and the mounting pad, and the axle seat bracket disposed between the suspension component and the axle and between the mounting pad and the axle; and
    wherein the mounting pad further comprises engagement surfaces adjacent the bores, and the first and second U-shaped fastener assemblies further comprise connectors having connector engagement surfaces that engage the respective mounting pad engagement surfaces; and
    wherein the first and second U-shaped fastener assemblies accommodate and then fix in position a preselected angular relationship between the suspension component and the vehicle axle while achieving and maintaining parallel engagement between the mounting pad engagement surfaces and the respective connector engagement surfaces.

2. The axle coupling assembly of claim 1 wherein the assembly is configured to accommodate a pre-selected caster angle or pinion angle.

3. The axle coupling assembly of claim 1 wherein the first and second flanges are integrally formed with the axle seat bracket.

4. The axle coupling assembly of claim 1 wherein the first and second flanges are bolted to the vehicle axle.

5. The axle coupling assembly of claim 1 further comprising a spacer disposed between the axle seat bracket and the suspension component.

6. The axle coupling assembly of claim 1 wherein the suspension component further comprises at least one leaf spring.

7. The axle coupling assembly of claim 1 wherein the suspension component is a leaf spring having ends formed into respective eyes.

8. The axle coupling assembly of claim 1 wherein the mounting pad is forged or comprises a weldment.

9. The axle coupling assembly of claim 1 wherein each bore through the mounting pad has an axis and the respective axes of the bores are parallel.

10. The axle coupling assembly of claim 1 wherein the axle seat bracket is configured to be mounted to a fabricated axle.

11. The axle coupling assembly of claim 1 wherein the suspension component is disposed above the axle seat bracket.

12. The axle coupling assembly of claim 1 wherein the axle is disposed above the suspension component.

13. The axle coupling assembly of claim 1 further comprising a bumper coupled to the mounting pad.

14. The axle coupling assembly of claim 1 wherein said first and second U-shaped fastener assemblies are disposed on opposing sides of the axle.

15. The axle coupling assembly of claim 1 further comprising a spacer disposed between the suspension component and the axle.

16. A method of coupling a suspension component to a vehicle axle comprising:
    providing first and second U-shaped fastener assemblies, each comprising a bight portion, first and second legs and connectors having engagement surfaces;
    providing an axle seat bracket having first and second flanges, each flange having a grooved surface that pivotally engages the bight portion of a respective U-shaped fastener assembly;
    providing a mounting pad being spaced from the grooved surfaces of the flanges and having bores through which the first and second legs of the U-shaped fastener assemblies extend;
    providing the suspension component between the first and second flanges and the mounting pad, and the axle seat bracket disposed between the suspension component and the axle and between the mounting pad and the axle; and
    installing the U-shaped fastener assemblies, wherein the axle coupling assembly automatically accommodates a caster or pinion angle while providing alignment between connector engagement surfaces and engagement surfaces of the mounting pad that are adjacent the respective bores.

17. An axle coupling assembly for connecting a suspension component to a vehicle axle, said axle coupling assembly comprising:
    first and second U-shaped fastener assemblies, each comprising a bight portion and first and second legs;
    an axle seat bracket having first and second flanges configured for connection to the vehicle axle, each flange having a grooved surface that pivotally engages the bight portion of one of the U-shaped fastener assemblies;

a mounting pad spaced from the first and second flanges and having bores through which the respective legs of the first and second U-shaped fastener assemblies extend;

the suspension component disposed between the first and second flanges and the mounting pad;

wherein the mounting pad further comprises engagement surfaces adjacent the bores, and the first and second U-shaped fasteners further comprise connectors having connector engagement surfaces that engage the respective mounting pad engagement surfaces; and wherein the mounting pad, leaf spring and axle seat bracket having flanges are pre-assembled as a unit for subsequent attachment to an axle such that the axle seat bracket is between the mounting pad and the axle.

* * * * *